United States Patent [19]

Muller

[11] Patent Number: 4,953,121
[45] Date of Patent: Aug. 28, 1990

[54] CIRCUITRY FOR AND METHOD OF CONTROLLING AN INSTRUCTION BUFFER IN A DATA-PROCESSING SYSTEM

[76] Inventor: Otto Muller, Am Guckenbuhl 10, D 7750 Konstanz 16, Fed. Rep. of Germany

[21] Appl. No.: 177,309

[22] Filed: Apr. 5, 1988

[30] Foreign Application Priority Data

Jan. 25, 1988 [DE] Fed. Rep. of Germany ....... 3802025

[51] Int. Cl.$^5$ ............................................ G06F 12/08
[52] U.S. Cl. ................................ 364/900; 364/938.1; 364/939.3; 364/942.8; 364/947.2; 364/964.22; 364/964.26
[58] Field of Search ... 364/200 MS File, 900 MS File

[56] References Cited

U.S. PATENT DOCUMENTS

| | | | |
|---|---|---|---|
| 4,467,414 | 8/1984 | Akagi et al. ......................... | 364/200 |
| 4,521,850 | 6/1985 | Wilhite et al. ....................... | 364/200 |
| 4,646,233 | 2/1987 | Weatherford et al. ............. | 364/200 |
| 4,714,994 | 12/1987 | Oklobdzija et al. ................ | 364/200 |

OTHER PUBLICATIONS

Van Loo, "Maximaze Performance by Choosing Best Memory", Computer Design, Aug. 1, 1987, pp. 89–94.
Computer Design 21, Apr. 1982, pp. 63–64.

*Primary Examiner*—THomas M. Heckler
*Attorney, Agent, or Firm*—SPrung, Horn, Kramer & Woods

[57] ABSTRACT

A method of controlling instructions in a data-processing system, wherein instructions including branching instructions pointing to an instruction address defining a branch address are loaded in sequence in response to a loading indicator that is always increased by no more than a prescribed difference in relation to an instruction address (BRA) that is constantly to be increased in accordance with one program runthrough and ahead of the instructions address, from instruction addresses in a main memory (MEM) into an instruction buffer memory (IBUF) and addressable therein by an instruction address. Instructions are supplied from the instruction buffer memory to an instruction decoder (IDEC) for exection, by comparing the branch address of a branching instruction while a program is being run with an instruction address range of instructions in the instruction buffer memory and, if the branch address is in said instruction address range, directly calling that addressed instruction out of the instruction buffer memory and, if the branch address is outside said instruction range, the branch address is accepted as a new loading indicator and the old instruction range is erased. The loading indicators (AP, FA) are supplied to the main memory (MEM) and at least selected bits of the loading indicator that are necessary for addressing the instruction buffer memory (IBUF) are supplied to an address pipeline (APL).

27 Claims, 4 Drawing Sheets

CIRCUITRY FOR AND METHOD OF CONTROLLING AN INSTRUCTION BUFFER IN A DATA-PROCESSING SYSTEM

BACKGROUND OF THE INVENTION

The invention relates to circuitry for and a method of controlling an instruction buffer memory in a data-processing system, whereby instructions are loaded in sequence, subject to controls obtained from a loading indicator that is always increased by no more than a prescribed difference in relation to an instruction address that is constantly to be increased in accordance with one program runthrough and ahead of the instruction address, from a main memory into the instruction buffer memory, from which the instructions, which are always subsequently addressed by the instruction address, are supplied to an instruction decoder for execution.

The article "Maximized Performance by Choosing Best Memory" in Computer Design, Aug. 1, 1987, pp. 89 ff., provides a survey of all the known cache memory systems and the methods of controlling them. Transferring sequences of program instructions that are ready to be executed from a main memory cache by cache into a buffer memory with a more rapid access time and hence to an instruction decoder in a program-controlled data-processing system with a program that is stored in a main memory along with input and output data from a processor is known. The instruction address of an instruction that is ready for execution is always compared with the address range of any instructions in the buffer memory and, if the instruction that is to be addressed is not in the buffer memory, the instruction that is being searched for is loaded along with an associated sequence of instructions that is as long as one cache out of the main memory and into a cache in the buffer memory. The instruction is then loaded therein, addressed there, and supplied to the instruction decoder, and arrives for execution. Further instructions are then selected once a subsequent instruction address has been obtained by program-dependent modification of the state of an instruction counter. The drawback to this circuitry is that the instruction sequences are transferred cache by cache, necessitating a particular transmission time that often results in waiting times that are consumed in transferring instructions that in certain runs are often unneeded and that are located on the cache upstream of the instruction being sought or downstream of a branch in the program at an instruction outside the cache. Furthermore, access on the part of requisite data to the main memory is often impeded during the transfer of such sometimes unneeded instructions.

Decreasing the mean waiting time for access to an instruction by transferring ahead of time a specific number of instructions stored downstream of the instruction that is to be executed to an access instruction buffer memory, from which they are subsequently called up for instruction decoding is also known from Computer Design 21 (1982), 4, p. 64. When, however, the program branches, there will still be a waiting time due to renewed access to the main memory, which will be stressed by the further preliminary unloading, which impedes requisite parallel data access. This is especially a serious drawback when programs are being multiply or cyclically run in loops, whereby the instructions must be obtained again and again from the main memory accompanied by corresponding detriment to the access because a delay in loading always occurs during a program when there is branching at the beginning of the loop due to interception of the first instructions in the program section.

OBJECT OF THE INVENTION

The object of the invention is to provide instruction buffer-memory circuitry and a method of controlling it that will decrease both the number of loading delays while a program is running and access load on the main memory by decreasing the number of instruction transfers into the instruction buffer memory while the program is running.

SUMMARY OF THE INVENTION

This object is attained in that the instruction buffer memory is complemented with a reserve instruction memory in which sequentially loaded instructions that have already been executed or skipped over remain and in that a branch address that occurs in the instruction-address section of a branching instruction while the program is being run is compared with the particular instruction-address range of whatever instruction is contained, preliminarily unloaded and held in reserve, that is, in the instruction buffer memory and, if the branch address that is directly called up out of the instruction buffer memory by that addressed instruction is therein and, if the branch address is in said instruction-address range, that addressed instruction is directly called up out of the instruction buffer memory and, if the branch address is outside said instruction-address range, the branch address is accepted as a new loading indicator and the old instruction-address range is erased.

Practical developments of the invention are disclosed herein.

In one practical embodiment of the invention the reserve buffer memory is combined in conjunction with a preliminary-access buffer memory into an instruction buffer memory in such a way that both can be operated cyclically with joint means of initiation.

It is especially practical for the instruction buffer memory to be separate from the register set upstream of the data-input terminals of the arithmetic stage so that a new instruction can always be called up while a data operation is being carried out.

The relief of the main memory from instruction access in accordance with the invention is a particular advantage when the main memory is organized page by page, whereby the page selection has longer page-changing times than the page-access time on one page. In commercially available memories this access-page ratio is approximately 4 to 1. Since the data and instructions are generally to be processed on different pages, one page change can always be eliminated when the instructions are obtained from the buffer memory and not out of the main memory.

It is conventional to associate with the main memory what is called a pipeline for the target addresses of the information requested from the main memory and emerging only subsequently, especially because of the main memory's longer page-access time, which corresponds to several machine cycles. This information is supplied to the register set or instruction buffer memory, depending on whether it is data or instructions that are being processed, in the system in accordance with the invention by means of an instruction buffer memory that is separate from the data-register set in accordance with the addresses. When the address of an instruction that is to be executed and is not yet in the instruction buffer memory is ready to be obtained, it is practical to have a test circuit that will also determine whether its address is for instance in the address pipeline and, if so, to wait until the instruction has been entered in the instruction buffer memory.

Another practical embodiment of the invention includes a special instruction, specifically a preliminary-loading instruction, that controls transfer of a prescribed number of instruction words in the instruction into the buffer memory.

The prescribed number of instruction words is provided in the instruction in terms of half words and rounded off if necessary to the next whole-number limit when the instruction words are transferred. The preliminary-loading instruction is employed to practical purposes when a higher number of main-memory data instructions follow one another, avoiding frequent page changing between instruction and data pages while the instruction is being executed because no interposed instruction accesses will thereby occur.

It is also practical to have a buffer-mode marker that can be established and erased in the program. This measure ensures that, in the case of a forward-skipping instruction with a relative address inside a loop and when the target instruction of the skipping instruction is not yet in the buffer memory, the forward-skipping branch will be executed first, followed by a wait until the sequence of instructions has been loaded as far as the target address into the instruction buffer memory, which means that the overall loop will be complete at that point and ready for multiple running before further instruction decoding and execution occurs. The buffer-mode marker also ensures that a sequence of instructions with an initial range that can in some situations by skipped over will be completely loaded and accordingly made available for multiple runs with no delays.

The preliminary-loading instruction and the instruction that sets the buffer-mode marker are in a practical way always inserted into a sequence of instructions by a compiler program when the aforesaid criteria are present.

Another practical embodiment of the invention utilizes instructions of varying word length, preferably with one to three half words that are then sequentially stored in the form of whole words, to improve exploitation of the instruction memory capacity, whereby the buffer memory is designed in such a way that whole words are always being written into it, although the instructions are supplied from the buffer to the instruction decoder with correctly positioned instruction and address components. One practical embodiment of the buffer memory in the form of a half-word memory with multiple readout allows undelayed access to the instructions and makes it possible to do without downstream fractional-word shifting or multiple access.

BRIEF DESCRIPTION OF THE DRAWINGS

A practical embodiment is illustrated in FIGS. 1 through 5.

DETAILED DESCRIPTION OF THE INVENTION

Figure 1:
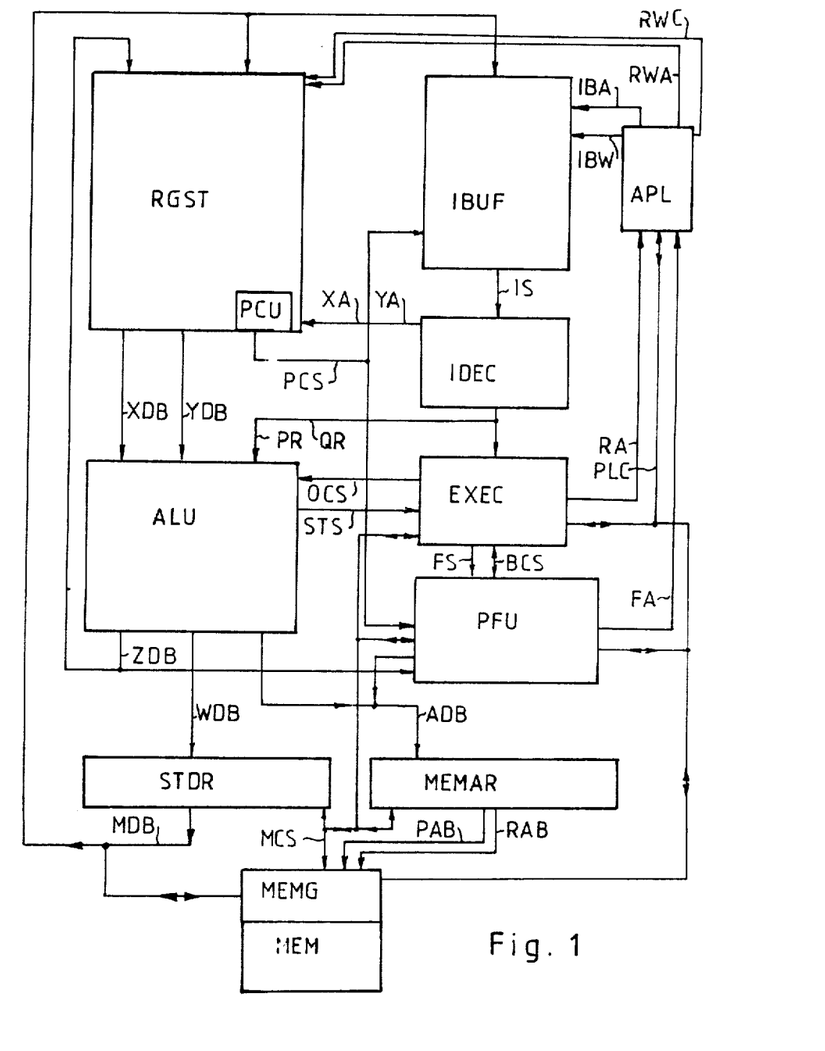
FIG. 1 is an overall illustration of the data-processing device.

FIG. 1 is a block diagram of a data-processing device with its data and program stored in a main memory MEM and supplied by way of a memory-data bus MDB in accordance with a memory-control stage MEMG to a register set RGST and hence by way of two data buses XDB and YDB to an arithmetic stage ALU or from memory-data bus MDB to a buffer memory IBUF and hence, controlled in accordance with call-up, to an instruction decoder IDEC and hence to an instruction-control stage EXEC. The instructions are sequentially called up by an instruction-address stage PCU that is connected to register set RGST by way of instruction-address signals PCS from buffer memory IBUF, whereby the instruction signals IS are supplied to instruction decoder IDEC. Instruction-address signals PCS are also supplied to an instruction-loading circuit PFU that also receives instruction-control signals FS from instruction-control stage EXEC for executing the special instructions and exchanges status-and-control signals, specifically branch-control signals BCS, pipeline-loading signals PLC, and status signals associated therewith, with the instruction-control stage EXEC of an address pipeline APL. Address pipeline APL always intercepts register-loading addresses RA or buffer-loading addresses FA and releases them delayed in the form of register-writing addresses RWA in conjunction with a register-writing signal RWC or in the form of buffer-writing addresses IBA in conjunction with a buffer-writing signal IBW to register set RGST or buffer memory IBUF. The delay equals the main-memory data-recovery time, which begins simultaneously with memory-address transfer by way of memory-control signals MCS. The associated main-memory addresses are emitted by way of a memory-address bus ADB from arithmetic stage ALU or from instruction-loading circuit PFU to a memory-address register MEMAR, whence they are usually supplied to main memory MEM by way of a page-address bus PAB and a line-address bus RAB.

The results calculated in arithmetic stage ALU are returned by way of a results-data bus ZDB to register set RGST or by way of a writing-data bus WDB and write register STDR to memory-data bus MDB and thus to memory-control stage MEMG for writing back into the main memory.

Arithmetic stage ALU is controlled by instruction-control signals OCS in accordance with state signals STS. The skipping-instruction addresses are, in the event of instruction branching, entered by way of results-data bus ZDB in instruction-address stage PCU and instruction-loading circuit PFU.

Figure 2:
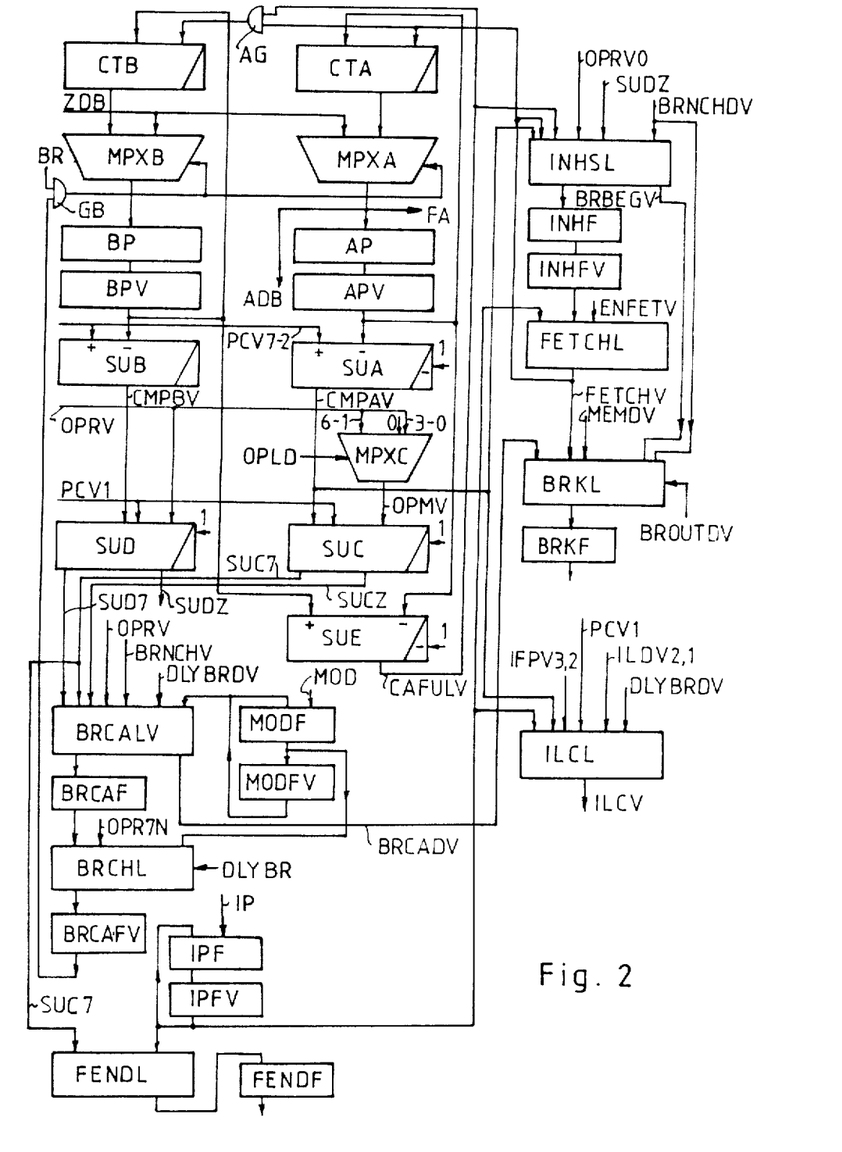
FIG. 2 is a block diagram of the buffer-control device.

FIG. 2 illustrates the details of instruction-loading circuit PFU. The flow of data through the circuit is initiated alternately in accordance with two unillustrated rate sequences. The registers and flip-flops controlled by one rate sequence are distinguished in the reference abbreviations from those controlled by the other rate sequence by a final letter "V." The numbers associated with a literal abbreviation represent the place of the signals in a binary number for a result at the output terminal of a register or adder. A letter "N" at the end represents a negated signal. An "F" at the last or penultimate place in a literal abbreviation represents a flip-flop. When formulas for the logical connection between signals are provided in the text, an "&" represents a logical AND and "v" a logical OR. The dimensions in the formulas occur at the output terminals of the circuit components in question and are always connected to one another correctly positioned and transferred at the next machine pulse into the circuit components that follow the result arrow.

Since the dimension of the buffer memory in the illustrated circuitry is assumed to be 64 half words at 16bits, the buffer-memory readout address is 6 bits long. Since the instruction are stored packaged into whole words, only bits 2 through 6 are utilized for write addressing. The lowest-value bit is labeled zero and, since it is employed for byte locating, has no function in this context.

The buffer memory is controlled by, in addition to the instruction counter of which the instruction-counter signals PCV are introduced into the controls, two indicator registers, specifically a 30-bit loading indicator register AP with a loading-indicator adder CTA and an auxiliary loading-indicator register APV and a 5-bit return-indicator register BP with a return-indicator adder CTB and an auxiliary return-indicator register BPV. When a branching instruction occurs in relation to an address that is outside the instruction buffer memory, the contents of the instruction counter and both indicators are set at the same value, for which purpose two loading multiplexers MPXB and MPXA are each connected to results-data bus ZDB by way of the output signal from an AND-gate circuit GB that is subject to a skipping-instruction signal BR and a branching signal BRCAFV. Loading indicator register AP is designed for the complete address of the main memory from bit 2 to bit 31, and return-indicator register BP accordingly only from bit 2 to bit 6.

Before any instruction is decoded, a test is conducted to determine whether the instruction is already in the instruction buffer memory. For this purpose the indicator always subtracts the last bits of instruction-address signals PCV7−2 in a summer SUB or SUA, constructing the negative number of the words COMPAV preliminarily stored in the instruction buffer memory along with the number of the reserved words CMPBV. When a branching instruction is executed, each skipping width OPRV or OPMV, which is provided in half words is added in additional summers SUD or SUC to the calculated word numbers along with a corrective 1 and the last bit of instruction-counter signals PCV1 such that any overflow SUC7 or SUD7 will indicate if the branching target is in the instruction buffer memory, subsequent to which the branching is immediately executed or, if its address is already in the loading indicator register AP, the branching is executed and the system waits until the target instruction word has been stored in the buffer memory, subsequent to which it is read out into the instruction decoder. The signals that control the various types of branching instructions and overflow signals SUC7 and SUD7 are determined in branching-evaluation circuits BRCALV or BRCHL in two time steps with downstream flip-flops BRCAF or BRCAFV, so the output signal BRCAFV released the execution of the branching or, in the other case, re-initiates buffer loading. For that purpose the skipping addresses are transferred only into the instruction counter when branching flip-flop BRCAFV is set and otherwise into loading-indicator registera AP or BP, and an instruction call-up is initiated.

The individual branching-control circuits BRCALV and BRCHL include the connections that will now be described.

If there is a backward-skip criterion OPRV0 and if the second summer SUD in the return indicator shows an overflow SUD7 or if there is a forward-skip criterion and the second summer SUC in the forward indicator does not show an overflow SUC7 or shows zero signals SUCZ in places 6-3, the intermediate-branching flip-flop BRCAF will be set if no skipping instruction has previously been executed, which would always be shown by skipping criterion BRANCH.

The logical equation is $$((OPRV0 \text{ and } SUD7) \text{ v } (OPRV0N \text{ and } (SUC7N \text{ v } SUCZ))) \text{ and } BRANCHVN \rightarrow BRCAF.$$

The second branching flip-flop BRCAFV is set when there is a criterion for a short instruction length OPR7N and either the first branching flip-flop BRCAF is set or a buffer-mode marker MODF is set and there is a criterion for a forward skip OPRON along with that for a delayed skip DLYBR.

The logical equation will accordingly be $$OPR7N \text{ and } (BRCAF \text{ v } (MODF \text{ and } OPRON \text{ and } DLYBR)) \rightarrow BRCAF.$$

A delayed skipping instruction is a skipping instruction followed in the program by an instruction that is always executed subsequent to the skipping instruction.

The buffer-mode marker MODF or MODFV is set or erased by means of status-processing instructions with control signals MOD. This protects the contents of the buffer in certain situations. If the buffer mode is present during a forward-oriented, relative, and delayed skipping instruction with an instruction length of half a word, the skipping target is evaluated as attainable in the buffer, even when the result of its comparison indicates that it is still outside. This measure prevents erasure of the content of the instruction buffer memory. The criteria for controlling the delayed or forward-oriented skip are branching-control signals deriving from the instruction controls.

A branching-control signal BRCADV that is equivalent to the signal that initiates branching flip-flop BRCAFV although obtained one pulse earlier is supplied to a preliminary instruction-loading circuit BRKL. The loading indicator is accordingly always increased by the length of one word for preliminary loading of instruction words. A 1 is added in the loading-indicator adder CTA for this purpose. After every time the loading indicator is altered by an increase of 1 or by being loaded with a branch address by way of loading multiplexer MPXA, the new loading indicator is forwarded in the form of a buffer-loading address FA to the address pipeline, whence it is supplied to the buffer memory at the correct time for the loading procedure. How far ahead of the particular actual instruction addresses the instruction word are preliminarily loaded into the buffer memory is determined by preliminary instruction-loading circuits INHSL, FETCHL, or BRKL. A 0 is added in loading-indicator adder CTA to halt preliminary loading. The decision as to whether preliminary loading should proceed is determined in preliminary instruction-loading circuit INHSL, and it is always stopped in the next pulse cycle when the number CMPAV of preliminarily loaded words is less than −8 or when it equals −8 and there is still one instruction-loading cycle. Preliminary loading is also stopped when a buffer-full criterion CAFULV is signaled and there is in the instruction decoder that has a skipping target in the instruction word a branching instruction that is indicated by the return indicator. This measure prevents the skipping target from being written over by the loading procedure. Buffer-full criterion CAFULV is always constructed by differentiating the register states BPV and APV and extracting a 1 in a fifth summer SUE when a 0 results. The result of this preliminary-loading decision logic circuit INHSL is transferred to the pair of flip-flops INHF or INHFV for the next pulse cycle.

The logical equations for preliminary instruction-loading circuit INHSL are $$((CMPAV7 - 2 < -7) \text{ and } ((CMPAV < -8) \vee FETCHV)) \vee (BRNCHDV \text{ and } OPRV0 \text{ and } CAFULV \text{ and } SUDZ) \rightarrow INHF$$

and $$BRNCHV \text{ and } OPRVO \text{ and } CAFULV \text{ and } SUDZ = BRGEGV$$

FETCHV is an instruction-loading criterion and SUDZ is a zero-result signal from the summer SUD in the return indicator.

The return-indicator criterion BRBEGV indicates when the skipping target is in the instruction word supplied by the return indicator.

The address register is always loaded and the memory cycle initiated in the cycle that follows determination of the preliminary-loading criterion when preliminary-loading flip-flop INHFV has not been set, when the address register is free and there is an address-pipeline free signal ENFETV, and an instruction-page error flip-flop IPFV has not been set.

The logical equation for preliminary instruction-loading circuit FETCHL, which generates instruction-loading criterion FETCHV, is $$INHFVN \text{ and } IPFVN \text{ and } ENFETV \rightarrow FETCHV$$

and it has the following results:
Loading-indicator adder CTA adds a 1,
return-indicator adder CTB adds a 1 is buffer-full criterion CAFULV is present,
the increased loading indicator is accepted in loading-indicator register AP,
places 6 through 2 in the increased loading indicator FA are accepted in the address pipeline, and
the increased loading indicator is accepted in the memory-address register by way of memory-address bus ADB.
At the next pulse the main-memory address is supplied to the main memory from the memory-address register through the page-address bus and the line-address bus, and a memory cycle is initiated unless the procedure is terminated by a break signal BRKF that is generated in a break circuit BRKL and supplied to a downstream break flip-flop BRKF. Break flip-flop BRKF is set when the address register is being loaded and
a memory instruction is decoded, which is signaled by a memory-instruction decoding signal MEMDV,
or an instruction is decoded that can cause a skip, whether or not the skip has actually been carried out, which is signaled by the decoding signal for an absolute-skip instruction BROUTDV, with the exception of skipping instructions that are addressed relative to the instruction counter with an instruction length of half a word, which are indicated by a relative-skipping signal BRNCHDV when its skipping target is attainable in the buffer memory, which is indicated by branching signal BRCADVN,
or a relative-skipping signal BRNCHDV is decoded when the buffer memory is full and the skipping target is in the instruction word in the buffer memory that return indicator BPV indicates, which is indicated by return-indicator criterion BRBEGV. The skipping target would otherwise be written over during preliminary instruction loading.

The logical equation for break circuit BRKL is $$FETCHV \text{ and } (MEMDV \vee BROUTDV \vee (BRNCHDV \text{ and } BRCADVN) \vee BRBEFV) \rightarrow BRKF.$$

The signal for the break signal flip-flop BRKF is impeded in that the memory address in the address register is switched to the address-compilation line and prevents transfer of the contents of first loading-indicator register BP or AP into the next downstream auxiliary return-indicator register BPV or APV, as is not illustrated in detail.

A completeness-testing circuit ILCL always determines whether an instruction with a first half word that is addressed in the buffer memory is completely available there.

Loading-indicator summer SUA provides the negative number COMPAV of instruction words in the preliminary-loading range. Of this number, no more than two instruction words can still be on the loading path. The number IFPV3 or 2 of instruction words in the address pipeline is entered in completeness-testing circuit ILCL from the address pipeline. Differentiating the aforesaid positive or negative numbers of words results in the total number IWRDYV7−2 in the buffer memory when the instruction-page error marker IPFV has not been set. Otherwise the total number of words is decreased by 1. There is at least one one-word availability WRDY1V when the negative number COMPAV of preliminarily loaded words and the total number IWRDYV7−2 of words are negative and, if instruction-page error marker IPFV has been set, total number IWRDYV7−2 of words is not −1.

There is at least one two-word availability WRDY2V when there is at least one-word availability WRDY1V and total number IWRDYV7−2 of words is less than −1 and when instruction-page error marker IPFV has been set and total number IWRDYV7−2 of words is not −2.

An instruction-availability signal RDYV is determined from decoded instruction length ILDV2 or ILDV1, from word availabilities WRDY1V and WRDY2V, and from the half-word address place of instruction address PCV1. When signal RDYV occurs, the decoded instruction length ILDV2 or ILDV1 is supplied in the form of increment signals ILCV to the instruction counter. This is the case when
at least two words are available,
or one word is available and the instruction is not a delayed skipping instruction, which always has a length of three half words, and the instruction either covers only one half word or, if it covers two half words, the first half word is at the beginning of a word.

If the instruction is a delayed skipping instruction, it will not be released until there is complete availability for the following instruction. If there is no complete availability, the instruction counter will be supplied with a zero. The sum of the instruction length of a delayed skipping instruction and the instruction length of the subsequent instruction is conventionally limited to no more than 3 half words.

The completeness-testing equations are $$CMPAV + IFPV3,2 = IWRDYV7 - 2.$$

$$(CMPAV<0) \text{ and } (IWRDYV7-2<0) \text{ and } (IPFV \text{ and } (IWRDYV7-2= -1))N = WRDY1V.$$

$$WRDY1V \text{ and } (IWRDYV7-2< -1) \text{ and } (IPFV \text{ and } (IWRDYV7-2= -2))N = WRDY2V.$$

$$(((ILDV2N \text{ v } (ILDV1N \text{ and } PCV1N)) \text{ and } WRDY1V \text{ and } DLYBRDVN) \text{ v } WRDY2V = RDYV.$$

$$ILDV2,1 \text{ and } RDYV = ILCV.$$

The symbol "=" represents equivalence.

When a preliminary-loading instruction is read out of the buffer memory, the decoding and execution of the subsequent instruction will be discontinued until the number of half words that is stated in the preliminary-loading instruction and that follows the instruction can be attained through the buffer memory. Since the number of half words is coded in operation-code places OPRV3 . . . 0, multiplexer MPXC will shift with the preliminary-loading instruction signal OPLD from the 6th to the 1st place in the skipping-width signal OPRV to places 3 through 0 in the same signal, with zeros supplied to the other input terminals. The multiplexer output-terminal signals are supplied to second summer SUC. Summer-overflow signal SUC7N and instruction-page error flip-flop signal IPFV are then, in loading-instruction transmission circuit FENDL, combined into an OR circuit, and the loading-instruction flip-flop FENDF is set with its output signal. If the instruction transmission travels through instruction-page error signal IPFV, the instruction will continue to be executed as long as complete instructions are present. If such is no longer the case, page-error processing will be initiated.

The logical formula is $$SUC7N \text{ v } IPFV \rightarrow FENDF.$$

The loading-instruction page transmission indicates that at least the number of half words stated in the loading instruction is attainable in the buffer memory and that the next instruction is to be loaded for decoding in the instruction decoder.

The buffer-mode marker MODF is part of a status register that can be varied subject to control by the program. Its state is in a practical way saved during subsidiary-program skips or during exception processing, and reset during the associated backward skips. If the buffer-mode marker is set, the skipping target is considered to be attainable in the buffer memory during forward skips with delayed skipping instructions with an instruction length of half a word, independent of the output signal of the branching-control circuit. The branching is then also carried out over the state of the loading indicator without indicator AP or BP being reset, and only when the instruction word that belongs to the skipping address has been loaded into the buffer memory and completeness testing has been carried out and availability ensured will the instruction be released for decoding at the skipping-in point. The buffer-mode marker will in this case remain set. With all other branching instructions, meaning undelayed branching instructions that arrive for execution, it will be erased.

The instruction-page error markers IPF and IPFV are set when memory-controls indicate a page error during an instruction loading cycle. Entry into the address pipeline is then erased and preliminary instruction loading discontinued. The program does not branch into page-error processing until the instruction is incomplete in the decoding stage and, due to the absence of a pipeline-address entry, no more instruction words can be expected from the memory and the previous instruction does not execute any undelayed branching, meaning that the instruction is actually being employed in the decoding stage. Every branching instruction with a target that cannot be attained in the buffer memory will erase the instruction-page error marker IPF or IPFV.

Figure 3:
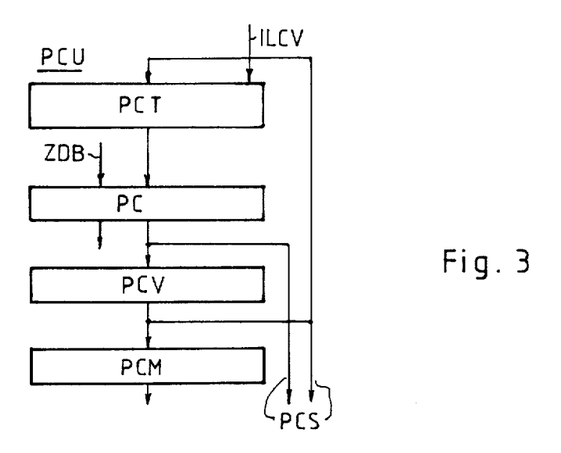
FIG. 3 is a block diagram of the instruction-counter circuit.

FIG. 3 is a schematic illustration of instruction counter PCU. Since instruction-address register PC and its downstream register PCV contain the instruction addresses, the instruction-address signals PCS are supplied from them at the corresponding pulse times to the buffer memory and to the instruction-loading circuit. Instruction-address signals PCS are also returned by way of an instruction-address adder PCT, to which the particular increment ILCV in accordance with the particular instruction length is supplied, to input terminals in instruction-address register PC if a branch address is not loaded into it from results-data bus ZDB. The previous instruction address is also accepted in a prompting register PCM, from which it can be called up by special programs.

Figure 4:
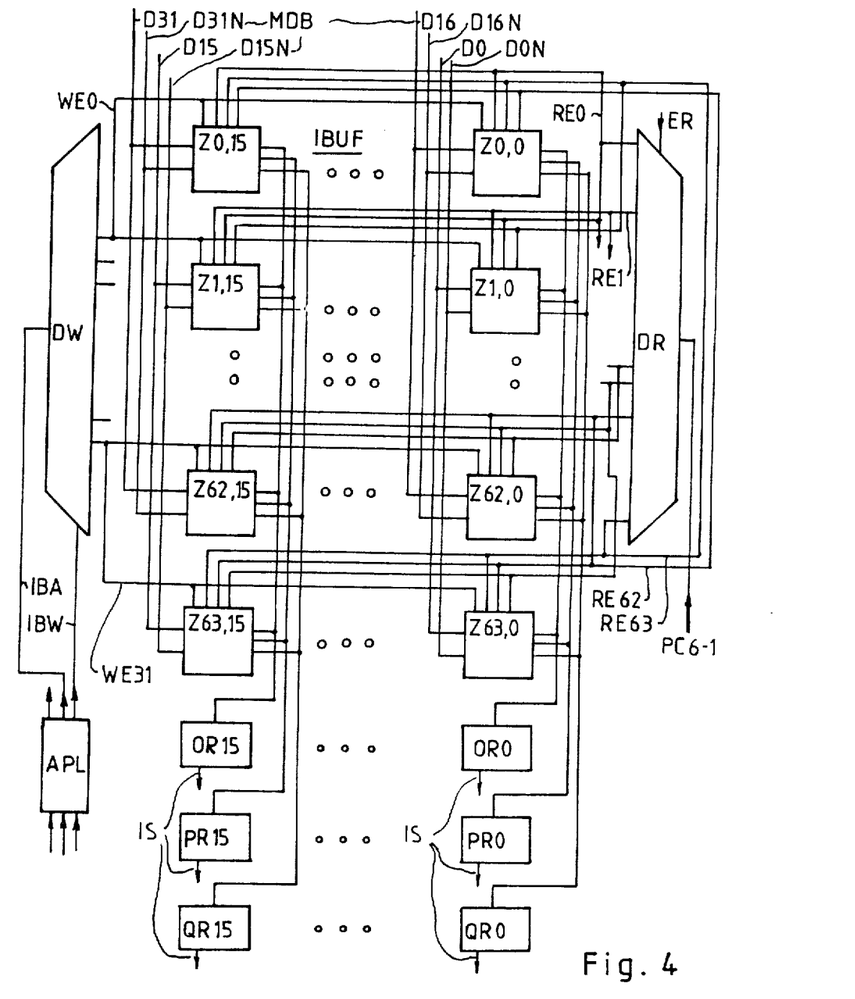
FIG. 4 is a block diagram of the buffer memory.

FIG. 4 is a circuit diagram of a practical embodiment of instruction-buffer memory IBUF, which consists of cells Z0,0; . . . ; Z63,15 for 64 half words at 16 bits. The instruction sequences are stored with whole words, with the data supplied from memory-data bus MDB to write-data lines D0, D0N; . . . ; D31, D31N and the associated instruction-write addresses IBA from address pipeline APL to write-address decoder DW, which always simultaneously triggers two adjacent buffer-memory lines, in which a whole word is stored, to one of the 32 write-decoder lines WE0, . . . , WE31 when there is an instruction-write signal IBW.

The instructions are read out of buffer memory IBUF with buffer-read address PC6-1, controlled by a read-release signal ER, by way of read decoder DR, which has 64 read-decoding output terminals RE0, . . . , RE63, which always act on the addressed half-word line with the same name itself and on the two following half-word lines, each associated with a first, second, or third read circuit. The associated output signals from memory cells Z0,0; . . . , Z63,15 are supplied column by column to three half-word registers or output amplifiers OR0, . . . , OR15; PR0, . . . , PR15; and QR0, . . . , QR15 in such a way that the first half word is stored in the operation-code register OR0, . . . , OR15 and the second and third half word into partial-address register PR0, . . . , PR15 and QR0, . . . , QR15 respectively.

Figure 5:
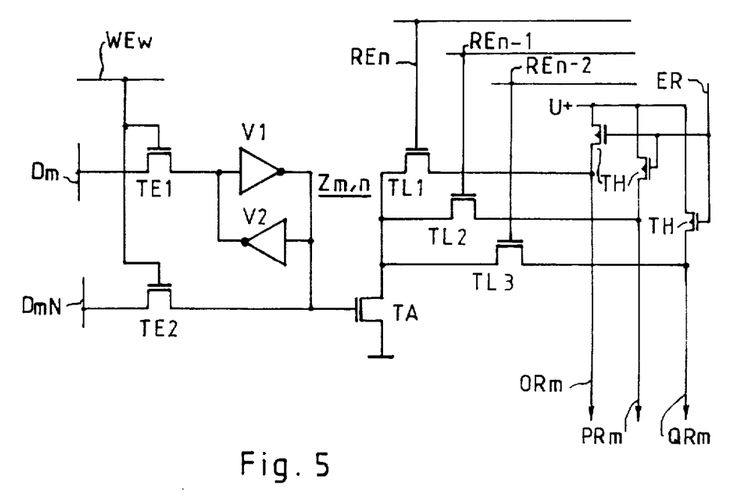
FIG. 5 illustrates the circuitry in one memory cell.

FIG. 5 shows an appropriate cell structure for a memory cell Zm,n with an mth column and an nth line. The memory-cell circuit consists of two weakly feedbacked inverters V1 and V2, into which a prescribed state is written, when a write-decoder line WEw for a wth word is activated and the particular data line Dm or DmN is activated, by means of input transistors TE1 and TE2 that constitute AND gates. The particular memory state is supplied in parallel from an output transistor TA to three read transistors TL1, TL2, and TL3, each of which is associated line by line with one of three read-decoder output terminals REn, REn-1, and REn-2, which have the same name as the read address or are addressed one or two addresses lower, are connected at the control input-terminal end, and are associated at the output-terminal end with one of three column-compilation lines, each of which leads to a column-by-column input terminal of the appropriate register places ORm, PRm, and QRm, of the operation-code register, and of the partial-address registers. Each column-compilation line is connected to a voltage line +U by way of loading transistors TH, controlled by read-release signal ER.

Thus, each instruction can, due to half-word addressability, be read out into the instruction register in the correct association independent of its position in the buffer memory with reference to storage of the instruction information in whole-word form. Instead of a register ORm, PRm, or QRm there can be a line of amplifiers. Input and output transistors TE1, TA, and TL1 are preferably MOS-FET's.

The buffer memory is located either by itself or preferably along with the control circuit and address pipeline as well as with the arithmetic and control stages in an integrated circuit, preferably manufactured by the CMOS technique.

Simulation with conventional test-mix programs has demonstrated that most, more than 90%, that is, of the skipping lines can be attained in the buffer memory. The memory had a capacity of 64 half words and the aforesaid controls. The control circuit described herein can also be carried out in the form of equivalent logic circuits, whereby for example the sequence of the first and second summers can be altered and/or a reserve-capacity counter can be employed.

It is understood that the specification and examples are illustrative but not limitative of the present invention and that other embodiments within the spirit and scope of the invention will suggest themselves to those skilled in the art.

What is claimed is:

1. In a method of controlling instructions in a data-processing system, wherein instructions including branching instructions pointing to an instruction address defining a branch address are loaded in sequence, in response to a loading indicator that is always increased by no more than a prescribed difference in relation to an instruction address (BRA) that is constantly to be increased in accordance with one program runthrough and ahead of the instructions address, from instruction addresses in a main memory (MEM) into an instruction buffer memory (IBUF) and addressable therein by an instruction address, instructions are supplied from the instruction buffer memory to an instruction decoder (IDEC) for execution, by comparing the branch address of a branching instruction while a program is being run with an instruction address range of instructions in the instruction buffer memory and, if the branch address is in said instruction address range, directly calling that addressed instruction out of the instruction buffer memory and, if the branch address is outside said instruction range, the branch address is accepted as a new loading indicator and the old instruction range is erased, the improvement comprising supplying the loading indicators (AP, FA) to the main memory (MEM) and supplying at least selected bits of the loading indicators that are necessary for addressing the instruction buffer memory (IBUF) to an address pipeline (APL), supplying the at least selected bits to the instruction buffer memory after a delay corresponding to a time during which a memory-access executes memory-access procedures in the prescribed address sequence, in the form of a buffer-memory write address (IBA) and wherein the comparing of the branch address with the address range of the instructions loaded in the instruction buffer memory includes comparing the branch address with the instruction-word addresses (FA) stored in the address pipeline and decoding an associated instruction as soon as the corresponding instruction has been loaded into the instruction buffer memory when an address that corresponds to the branching address is in the address pipeline.

2. A method according to claim 1, wherein a buffer-mode marker (MODF) can be set and erased in accordance with an instruction and is erased by undelayed skipping instructions such that, when it is set, a branching address of a delayed skipping instruction that is half a word long is not accepted as a new loading indicator and the address range is not erased, whereas the branching address is loaded into an instruction counter such that accordingly addressed instruction will always be released for decoding once its availability has been established by the buffer being loaded as far as the instruction-counter state.

3. A method according to claim 2, wherein the instruction to set the buffer-mode marker (MODF) is always introduced, subject to the control of a compiler, where, in a program loop that is to be run several times and that is no longer than the size of the reserve buffer, instructions for skipping forward to skipping lines inside the loop are contained.

4. A method according to claim 2 or 3, wherein the particular state of the buffer-mode marker (MODF) is saved at the beginning of subsidiary programs and interrupt programs and is restored at their end.

5. A method according claim 1, wherein the various types of instructions have different lengths, ranging from one to three instruction-word components and wherein, before any instruction is executed, an operation component, which is the first and if necessary the second instruction-word component of the particular instruction, is decoded in relation to instruction length, and complete availability in the instruction buffer memory (IBUF) and if applicable in the address pipeline (APL) of whatever instruction-word components belong to the instruction is determined, and the instruction is not executed until all the instruction-word components of the particular instruction are available and have been transferred into the instruction decoder (IDEC), subsequent to which the instruction address is incremented by the length of the instruction.

6. A method according to claim 5, wherein, when the maximal instruction length is three half words nd the pipeline capacity is two whole words, availability is determined by, taking the instruction words in the pipeline into consideration, determining one-word availability and two-word availability and reporting complete availability when there is either at least two-word availability or when there is one-word availability and the instruction comprises less than three half words and the first half word is situated at the beginning of a whole word, which is indicated by a zero at the half-word address place, or the instruction is only half an instruction word long.

7. A method according to claim 5, wherein the number of half instruction words that are to be preliminarily loaded is always specified in the preliminary-loading instruction and the number of whole words loaded in accordance therewith into the instruction buffer memory (IBUF) is such that the specified half instruction words can be attained therein.

8. A method according to claim 5, wherein one type of instruction is a delayed relative skipping instruction, which always has an instruction downstream of it, whereby their joint instruction length is no more than three half words, and wherein complete availability for such a delayed skipping instruction is always considered to have been determined when the three half words are available, subsequent to which the subsidiary instruction always arrives for execution after the skipping instruction, even when a branching has been executed along with the skipping instruction.

9. A method according to claim 1, wherein the preliminary loading of the instruction buffer memory (IBUF) is controlled depending on a preliminary-loading instruction in accordance with a number (APRV3−0) of instruction words or instruction half words reported in the preliminary-loading instruction, for which purpose a specific difference (CMPAV) between the instruction address (PCV7−2) and the particular auxiliary loading-indicator address (APV) is constantly compared with the reported number (OPRV3−0) and the resulting preliminary-loading end releases an instruction in the instruction decoder (IDEC) for execution.

10. A method according to claim 9, wherein the preliminary-loading instruction is, subject to the control of a compiler, inserted into the program at whatever point is followed by a prescribed number of main-memory data instructions and/or by a program loop that is to be run several times, that is no longer than the size of the reserve buffer memory, and that has a loop-application point downstream of where the loop commences when the loop-application point is inside a prescribed range.

11. A method according to claim 1, wherein the loading indicator is compared, before it is increased, with a reserve indicator (BP) that always indicates the farthest instruction word back and, if the comparison results in a buffer-full signal (CAFULCV), increases the reserve indicator (BP) by a single 1 at a word-address bit.

12. A method according to claim 1, wherein the address pipeline (APL) is employed for the addresses (FA, RA) of instruction words to be obtained from the main memory (MEM) and of data words that are to be supplied to a register set (RGST), and characteristics associated with the instruction-word addresses (FA) are also entered into the address pipeline, in accordance with which the presence of instruction-word addresses (FA) in the address pipeline is taken into consideration during the comparison.

13. A method according to claim 1, wherein the main memory (MEM) has a page-by-page organization that generates an instruction-page error signal when one of the instruction addresses (ADB) supplied to the main memory (MEM) refers to a page that is not currently present in the main memory, upon which the corresponding instruction address simultaneously present in the address pipeline (APL) is erased and only one instruction is accordingly executed, setting an instruction-page error marker (IPF), in accordance with which any further preliminary loading is discontinued and, if a branching instruction to an instruction address that is not attainable in the instruction buffer memory (IBUF) is executed, the instruction-page marker is erased and, if the last available instruction that is to be executed is not a branching instruction and the instruction page error marker is still set, branching into an instruction-page error processing occurs.

14. In a data processing system including a main memory (MEM) having instruction words therein, an instruction buffer memory (IBUF) for receiving instruction words from the main memory (MEM), a loading-indicator register (AP, APV) storing a loading indicator (FA) for controlling the loading of instruction words from the main memory to the buffer memory, a loading-indicator adder (CTA) for indicating a prescribed maximal number of preliminary-loading words in advance of an instruction address and for constantly increasing the number of an instruction counter (PCU) for controlling the instruction words read from the buffer while a program runs, an instruction decoder (IDEC) for receiving the instruction words read from the buffer memory, wherein the instruction buffer memory has an instruction reserve memory wherein instructions that have already been executed or instruction words that have been constantly stored and skipped over remain, a second indicator register (BP, BPV) for storing a second indicator indicating the contents of the reserve memory, means for producing sum signals in the presence of a branching instruction from accordingly resulting skip-width signals (OPRV6−1) in summing stages (SUA, SUB, SUC, SUD) along with the loading indicator and the second indicator, a branching-control circuit (BRCALV, BRACHL) receptive of the sum signals for indicating that the branching address is in the preliminary loaded instruction buffer memory (IBUF) or in the instruction reserve memory and, if not, loading an initial value in the loading-indicator register (AP, APV), the improvement comprising an address pipeline for supplying the loading-address indicator (FA) to the instruction buffer memory (IBUF) and having a capacity that is dimensioned in accordance with the access time of the main memory (MEM) and a completeness-testing circuit (ILCL) receptive of any number (IFPV3, 2) of instruction words that are present from the pipeline for producing an output signal (ILCV) that reports the complete availability in the instruction buffer memory (BUF) of an instruction addressed by the instruction address and for triggering the instruction counter (PUC) to increment the instruction address by a particular instruction length.

15. Circuitry according to claim 14, further comprising means for writing two half words, addressed in the form of whole words, into the instruction buffer memory (IBUF) with the loading-indicator address and for reading out, with the instruction address, three half words.

16. Circuitry according to claim 15, wherein the instruction buffer memory (IBUF) is at least a component of an integrated circuit comprises cells (Zm, n) are arrayed in n lines and m columns of the length of half a word, wherein each pair of adjacent lines is connected by write-address lines (WEw) to output terminals of a write-address decoder (DW), each of which, subject to the control of a write-control signal (IBW), emits an output signal and that are connected to data lines (Dm, DmN), which are oriented column by column by way of write-AND circuits (TE1, TE2) such that they accept a binary cell state in a listable memory components (V1, V2), and to each output terminal of which three output-AND gates (TL1, TL2, TL3) are connected that are at the output end combined column by column into wired OR circuits and accordingly supplied to output terminals, and their other inputs are activated line-by-line by read-decoder output lines (RE, REn-1, REn-2) of a read decoder (DR) adjacently cyclically and displaced by one or two lines.

17. Circuitry according to claim 16, wherein the write-AND circuits (TE1, TE2) are MOS-FET's with their gate electrodes are connected to the write-decoder line (WEw).

18. Circuitry according to claim 16, wherein the bistable memory component (V1, V2) is a mutually feed-backed system of two inverters (V1, V2) with feedbacks that are weaker than the activation by the write-AND circuits (TE1, TE2).

19. Circuitry according to claim 16, 17, or 18, wherein a MOS-FET (TA) is controlled by the bistable memory component (V1, V2), three other MOS-FET's (TL1, TL2, and TL3) are on the one hand supplied to the output terminal of the first MOS-FET, create output-AND gates, are connected at the gate end in association with associated read-decoder output lines (REn, REn-1, REn-2), and are on the other hand connected column-by-column together and each column by column by means of a loading transistor (TH) that is controlled by a read-release signal (ER) to a voltage line (+U) and lead to the output terminals.

20. Circuitry according to claim 19, wherein registers or amplifiers (OR0, . . . , OR15; PR0, . . . , PR15; QR0, . . . , QR15) that terminate or amplify the output signals are positioned at the output terminals for every three half words.

21. Circuitry according to claim 16, wherein the instruction buffer memory (IBUF), the instruction-loading circuit (PFU) and the address pipeline (APL) are located in an integrated circuit.

22. Circuitry according to claim 15, wherein the instruction decoder decodes an instruction length (ILDV2,1) from the first and from the second instruction half word, and supplies the decoded instruction length to the completeness-testing circuit (ILCL) having means for evaluating same such that the completeness of an instruction is always considered as given when at least two words are available or when one word is available and the instruction is not a delayed skipping instruction and the instruction either comprises only one half word or, if it comprises two half words, the first half word is situated at the beginning of a word, and the position of the first half instruction word in relation to the whole instruction word is evaluated depending on the half-word address place (PCV1) of the instruction counter (PCU), and wherein, when there is completeness, the instruction length is supplied as an increment (ILCV) to the instruction counter.

23. Circuitry according to claim 22, wherein the instruction decoder decodes a delay skipping signal (DLYBRDV, DLYBR) and supplies same to the completeness-testing circuit to evaluate an instruction of three half words during completeness testing.

24. Circuitry according to claim 14, further comprising means for cyclically loading the instruction buffer memory comprising a third summer stage and wherein the loading-indicator register (AP, APV) is operated along with the loading-indicator adder (CTA) and the return indicator register (BP, BPV) along with a return-indicator adder (CTB) modulo to determine a maximal capacity of the instruction buffer memory (IBUF) and the loading indicator and a corrective 1 from the return indicator is always subtracted in the third summer (SUE) before the loading indicator is increased and, if its zero output signals that maximal capacity (CAFULV) has been attained, the return indicator is also increased by way of the return-indicator added (CTB).

25. Circuitry according to claim 14, wherein the number of preliminary-loading words is a particular number or a number (OPRV3−0) that can be prescribed by a preliminary-loading instruction criterion (OPLD) and further comprising a multiplexer (MPXC) controlled by the preliminary-loading instruction criterion (OPLD) for supplying the preliminary-loading words to the second summer (SUC) of the loading indicator, a loading-instruction transmission circuit (FENDL) for evaluating the overflow signal of the second summer stage such that the instruction buffer memory (IBUF) is loaded until said overflow signal (SUC7) occurs, upon which the next instruction designated by the instruction address is read and executed.

26. Circuitry according to claim 14, further comprising means for setting a buffer-mode marker (MODF, MODFV) by instructions and for erasing same by a control signal of an undelayed skipping instruction and means for supplying the state of the buffer-code marker to the branching-control circuit (BRCALV, BRCHL), which, when it is set and when the forward skips are delayed by the instruction length of half a word, always signals that the skipping target is attainable in the buffer memory.

27. Circuitry as in claim 14, wherein the summing stages include a first summer stage for subtracting the instruction address (PCV7−2) along with loading indicator (FA) and with the second indicator and second summing stage (SUC, SUD) for adding the results of the first summer stage along with a skipping width (OPRV6−1) of a branching instruction and with a correction 1 and a branching-control circuit (BRCALV, BRCHL) for connecting the sums such that, when the summing stages indicate an overflow (SUC7, SUD7) or the loading-indicator summing stage (SUC) indicates a zero result (SUCX), the branching address is the buffer-read address and otherwise the branching address is written into the loading-indicator register (AP, APV) and the second indicator register (BP, BPV and the instruction counter (PCU) and supplied by the loading-indicator register (AP, APV) to the main memory (MEM) and the address pipeline.

* * * * *